US007347218B1

(12) United States Patent
Reimer et al.

(10) Patent No.: US 7,347,218 B1

(45) Date of Patent: Mar. 25, 2008

(54) ROOF CAP REMOVAL TOOL

(76) Inventors: Cory Reimer, 154 Woodbury St. SW., New Prague, MN (US) 56071; Duane Reimer, 750-229th St. W., Jordan, MN (US) 55352; Jon Dorn, 7672 Mustang La., Lino Lakes, MN (US) 55014

( * ) Notice: Subject to any disclaimer, the term of this patent is extended or adjusted under 35 U.S.C. 154(b) by 468 days.

(21) Appl. No.: 11/192,941

(22) Filed: Jul. 29, 2005

(51) Int. Cl.
*F16L 55/10* (2006.01)

(52) U.S. Cl. ............................ 137/15.18; 137/315.41; 137/315.42; 138/89; 138/90

(58) Field of Classification Search ........... 137/315.42, 137/315.41, 15.08, 15.18; 138/89, 90
See application file for complete search history.

(56) References Cited

U.S. PATENT DOCUMENTS

| | | | | |
|---|---|---|---|---|
| 517,919 | A | 4/1894 | Frerichs | |
| 1,993,307 | A * | 3/1935 | Nicholson | 138/89 |
| 3,983,904 | A | 10/1976 | Laviano | |
| 4,372,585 | A * | 2/1983 | Evora | 138/96 R |
| 5,094,809 | A | 3/1992 | Lenoble et al. | |
| 5,520,219 | A | 5/1996 | Hessian | |
| 5,687,773 | A | 11/1997 | Ryan et al. | |
| 5,865,214 | A | 2/1999 | Stearns | |
| 6,182,704 | B1 | 2/2001 | Bevacco | |
| 6,520,212 | B1 | 2/2003 | Blivet | |
| 7,272,971 | B1 * | 9/2007 | Reimer et al. | 73/46 |

* cited by examiner

*Primary Examiner*—Kevin Lee

(74) *Attorney, Agent, or Firm*—Larkin Hoffman Daly & Lindgren Ltd.; Thomas J. Oppold

(57) ABSTRACT

The present invention provides a method and apparatus for removing a test plug from a vent when positioned at a remote location with respect to the vent. The apparatus includes a cover having a handle section and base, the cover being visible from a remote location with respect to the vent. The apparatus further includes a retainer coupled to the cover by a connecting sleeve. The test plug is maintained between the cover and retainer and is removable from the vent by forcibly engaging the apparatus with a retrieval device configured to extend from the remote location to the vent.

19 Claims, 6 Drawing Sheets

ROOF CAP REMOVAL TOOL

BACKGROUND OF THE INVENTION

1. Field of the Invention

The present invention relates generally to plumbing systems. In particular, the present invention relates to a method and apparatus for use in removing a test cap from a plumbing system vent pipe by an operator positioned at a location remote from the vent pipe.

2. Background of the Prior Art

Plumbing codes require that plumbing systems be vented through a plumbing vent pipe extending above a building roof. Additionally, codes require a plumbing system to be tested during rough-in inspections, and that a final plumbing pressure test be performed after the plumbing fixtures have been set in place.

Test caps are commonly used for temporarily sealing the plumbing system vent pipe during pressure testing. Once testing is completed, the test cap must be removed so that the plumbing vent pipe may provide adequate venting of the installed plumbing system.

Additionally, some statutes require that all test caps on plumbing vent pipes be visible from a ground level with respect to the roof. Such laws were enacted to allow an inspector to see if the test cap is in place, or has been removed after final plumbing inspections. Failure to remove plumbing system vent pipe test caps results in inadequate or no ventilation of the plumbing system.

Many systems exist for capping plumbing roof vents for testing purposes. One common system is the use of plastic test plug. The periphery of the body is connected to a bottom edge of a side wall, such that the body and side wall fit within the roof vent. A retaining lip extends from a top edge of the side wall to engage the top edge of the roof vent. The test plug body generally includes one or more upwardly extending flanges.

The body of the test plug is frangible. After pressure testing, a force is applied to the test plug body to frangibly separate the body from the side wall. The body is removed from the roof vent pipe by gripping one of the flanges and removing the test plug body from the roof vent pipe.

A problem with such prior art devices is that the test plug may not always be visible when positioned at a remote location with respect to the roof vent. Additionally, removal of the test plug requires a user to access the roof. This can be a dangerous task, particularly in poor weather conditions, such as where snow and ice may cover a roof top, making access unsafe. In such circumstances, removal of a test plug from a roof vent pipe may not be possible for extended periods of time, until weather conditions improve.

U.S. Pat. No. 5,520,219 issued to Hessian provides a removable vent stack test cap that addresses the problem of accessing the roof of a building in order to remove a test cap therefrom. In order to solve this problem, Hessian '219 teaches away from the use of the test plug discussed above. Hessian '219 instead discloses a prefabricated capping member having a top portion and bottom portion connected together by a frangible neck. The bottom portion is inserted into or over a roof vent. The top portion is configured to be accessible by a cap removal tool extending from a location separate from the roof.

The capping member in Hessian '219 is not reusable and, therefore, requires an entirely new frangible capping member to be used with every roof vent. Additionally, the capping member from Hessian '219 differs substantially in structure and use from the plastic test plugs, discussed previously, that are in common use in the plumbing industry.

It would, therefore, be advantageous to provide an improved apparatus and method for capping a roof vent and removing a test plug therefrom that overcomes these and additional problems of the prior art.

SUMMARY OF THE INVENTION

The present invention provides a method and apparatus for removing a test plug from a vent when positioned at a remote location with respect to the vent. An intended use of the present invention is for removing the test plug from a vent for a plumbing system, such vent being positioned on the roof of a structure and being removable without requiring a person to access the roof.

The apparatus includes, generally, a cover having a handle and a base. The handle is configured to be visible from the remote location when positioned over the vent. The base of the cover is coupled to a retainer by a connecting sleeve that, in operation, extends from the base of the cover into the vent. The retainer and base cooperate and maintain the test plug therebetween. Additionally, a pressure seal may be received about the connecting sleeve to engage the test plug and ensure that the test plug and apparatus will provide a pressure seal to the vent during testing.

The test plug has a generally disc shaped body with a central aperture for positioning over the connecting sleeve. The body operably extends across the vent opening. An outer ring extends about the periphery of the body to engage the inner wall of the vent. A lip extends from a top edge of the outer ring to engage the top edge of the vent. The test plug is frangible about the periphery of the body.

To remove the apparatus, a retrieval device having an elongate body is extended from a first end at the remote location to a second end proximate the vent. The second end of the retrieval device has a retrieval section for forcibly engaging the handle of the apparatus, causing the test plug body to fracture about the periphery. The apparatus is then removed from the vent without requiring access to the roof and/or vent location. Upon retrieval, the test plug body is removed from the apparatus and a new test plug may then be used with the apparatus.

DETAILED DESCRIPTION OF THE PREFERRED EMBODIMENTS

Figure 1:
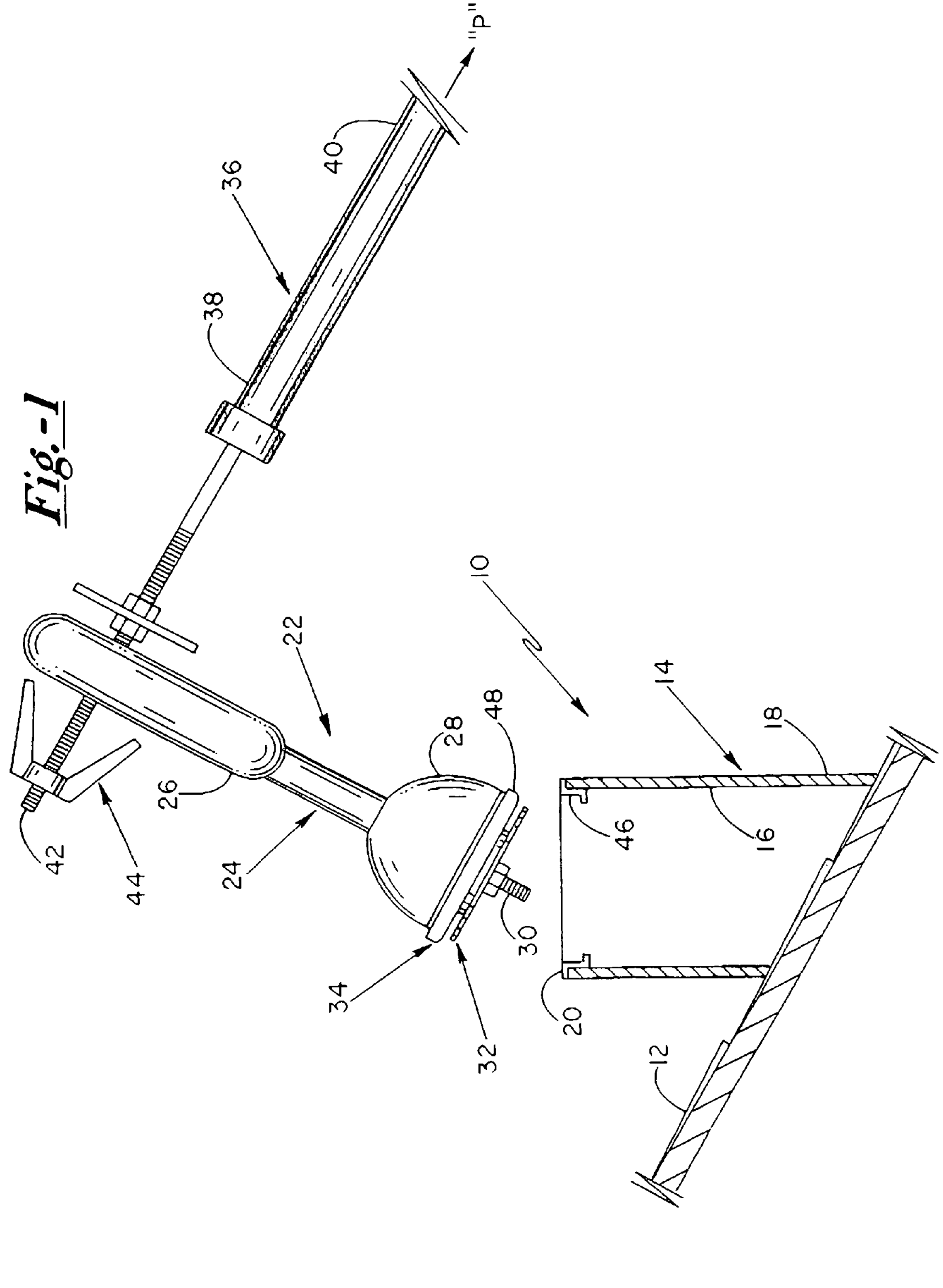
FIG. 1 is a side elevational view of an apparatus for removing a test plug in accordance with the present invention.

The present invention provides, generally, a method and apparatus for removing a test plug from a vent. The various embodiments of the present invention are illustrated in the figures, where like reference numerals refer to like features.

FIG. 1 shows a vent 10 positioned on a roof 12 of a structure. The vent 10 is generally cylindrical in shape and has a vertical side wall 14 defining an inner diameter 16, an outer diameter 18 and a top edge 20 of the vent 10. The vent 10 is connected to and in fluid communication with the plumbing system (not shown) of the structure.

The apparatus 22 includes a cover 24 configured to extend from the top edge 20 of the vent 10. The cover 24 has a handle section 26 and a base section 28. A connecting sleeve 30 extends from the base 28 to selectively couple the cover 24 to a retainer 32. A test plug 34 is received over the connecting sleeve 30 and is maintained between the cover 24 and the retainer 32.

In a testing orientation, the apparatus 22 and test plug 34 cooperate to seal the vent 10, allowing the plumbing system to be pressurized. The handle 26 is visible from a remote position P with respect to the vent 10, such as from the ground.

The apparatus 22 and test plug 34 are removable from the vent 10 by an elongate retrieval device 36 extending from the remote position P. The retrieval device 36 has an elongate body 38 extending from a first end 40 at the remote position P to a second end 42 capable of contacting the apparatus 22. The second end 42 of the retrieval device 36 has a retrieving section 44 configured to forcibly engage the handle 26 of the apparatus 22. The retrieval device 36 is used to open the vent 10 by fracturing the test plug 34 and retrieving the apparatus 22 from the vent 10, without requiring a user to access the roof.

As shown, the test plug 34 includes an outer ring 46 that is frangible with respect to a body 48 of the test plug 34. When retrieved from the vent 10, the body 48 of the test plug 34 may be removed from the apparatus 22 such that the apparatus 22 may be reused with a new test plug 34.

Figure 2:
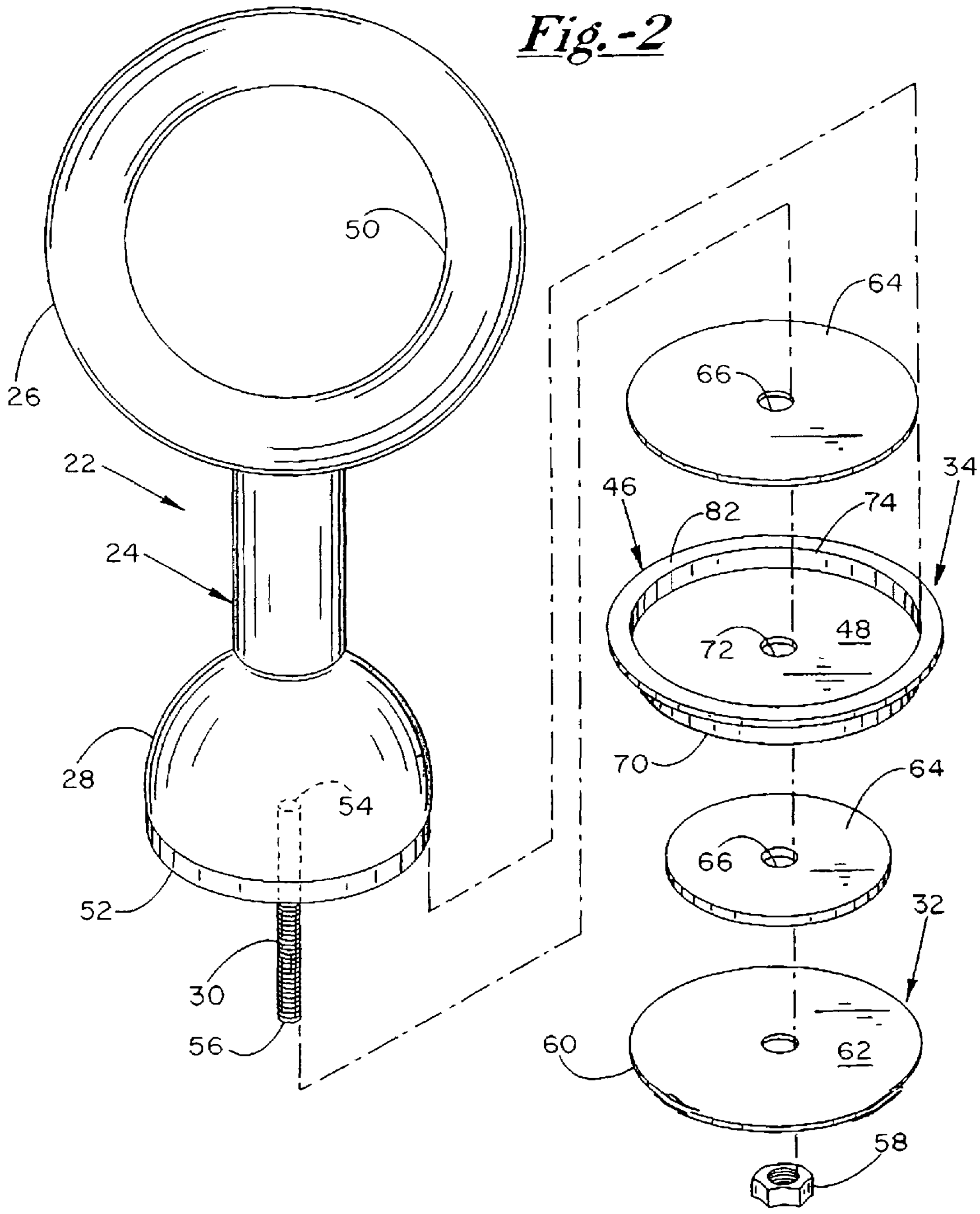
FIG. 2 is an exploded side view of the apparatus from FIG. 1.

The apparatus 22 is shown in more detail in FIG. 2. The handle 26 of the present embodiment is a generally ring shaped structure oriented so as to operably provide a vertically oriented eyelet. The handle 26 defines a receiving section 50 through which the retrieval device 36 is extended to initiate removal of the apparatus 22 from the vent 10. The handle 26 further includes a base 28 having a bottom surface 52 for engaging the test plug 34. In the present embodiment, the cover 24 is a unitary structure, but may, instead, have a separately formed handle and base structure.

Figure 3:
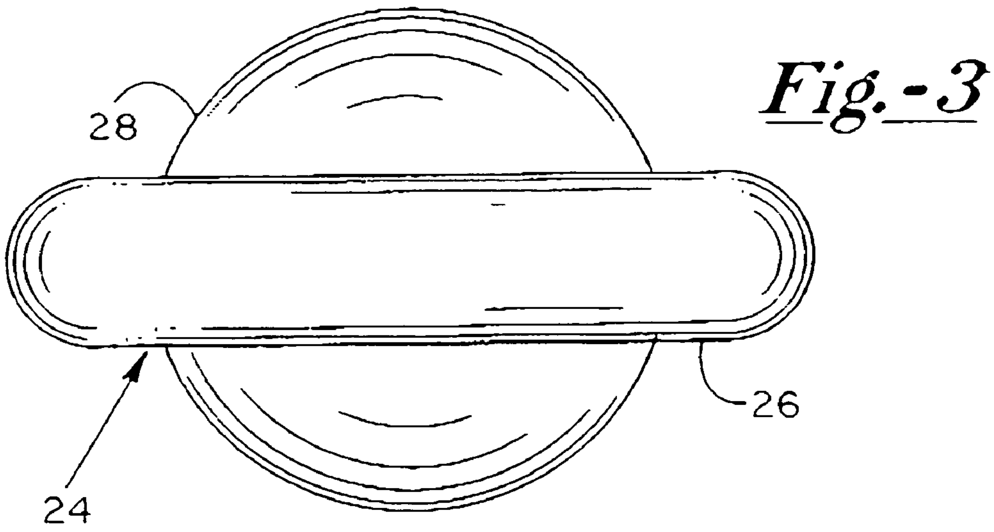
FIG. 3 is a top view of the apparatus from FIGS. 1 and 2.

FIG. 3 shows a top view of the cover 24 wherein at least one section of the handle 26 is configured to be wider than the diameter of the base 28 and/or vent 10 so as to prevent the apparatus 22 from falling into the vent 10.

The connecting sleeve 30 is an elongate structure having a first end 54 axially extending from the base 28 such that in operation the connecting sleeve 30 extends into the vent 10. The connecting sleeve 30 of the present embodiment is threaded to provide an adjusting mechanism for the retainer 32 selectively coupled to a second end 56 of the connecting sleeve 30.

The retainer 32 of the present embodiment is a nut 58 and washer 60 combination wherein the nut 58 provides an adjustable retaining mechanism and the washer 60 provides a retaining surface 62 for engaging the test plug 34.

As shown, one or more pressure seals 64 may be provided about the connecting sleeve 30 to ensure that the apparatus 22 and test plug 34 are capable of providing a pressure seal to the vent 10 during pressure testing of the plumbing system. The pressure seal 64 may be a rubber washer having a central aperture 66 to allow the pressure seal 64 to be received over the connecting sleeve 30. In the present embodiment, the pressure seal 64 is positioned between the base 28 of the cover 24 and the test plug 34 to allow the cover 24 to sealingly engage the test plug 34.

The test plug 34 is maintained between the cover 24 and retainer 32 by selectively adjusting the retainer 32 such that the test plug 34 is engaged on opposing sides 68, 70 by both the cover 24 and retainer 32 (via the one or more pressure seals, if present).

Figure 4:
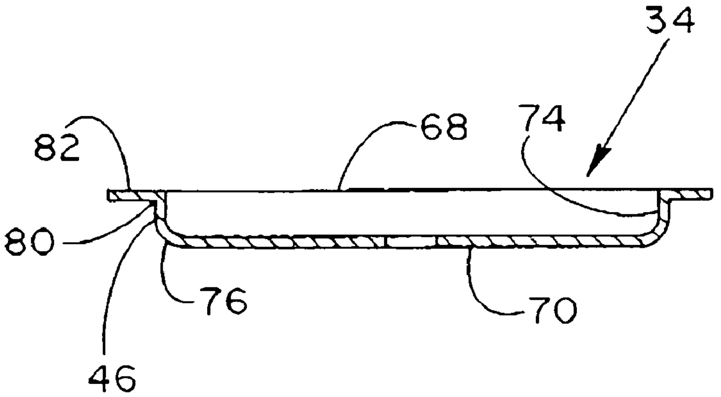
FIG. 4 is a side view of an embodiment of a test plug for use with the apparatus from FIGS. 1-3.
Figure 5:
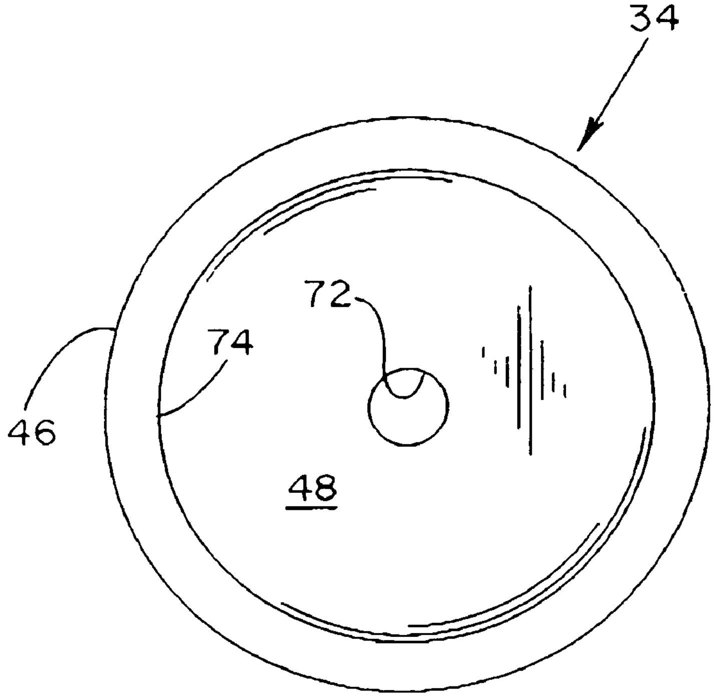
FIG. 5 is a top view of the test plug from FIG. 4.

The test plug 34 in accordance with the present invention is illustrated in more detail in FIGS. 4 and 5. The test plug 34 has a generally disc-shaped body 48 having a first surface 68 and a second surface 70. The disc-shaped body 48 has a central aperture 72 extending therethrough configured to be receivable about the connecting sleeve 30. At the periphery 74 of the body 48 is an outer ring 46 configured to engage the inner diameter 16 of the vent 10. The outer ring 46 has a first, bottom edge 76 that engages the periphery 74 of the body 48 and a second, top edge 80. A lip 82 extends outwardly from the top edge 80 of the outer ring 46 and is configured to engage the top edge 20 of the side wall 14 of the vent 10.

The test plug 34 is made of a frangible material, such as any suitable plastic material. In use, when a force is applied to the apparatus 22 the test plug 34 will fracture about the periphery 74 of the body 48. When the apparatus 22 is retrieved from the vent 10, the body 48 of the test plug 34 is removed therefrom whereas the outer ring 46 and lip 82 may remain connected to the vent 10. Nonetheless, the vent 10 will be free of obstruction when the body 48 of the test plug 34 is removed therefrom.

The fractured body 48 of the test plug 34 may then be removed from the apparatus 22, allowing the apparatus 22 to be reused with a new test plug 34.

Figure 6:
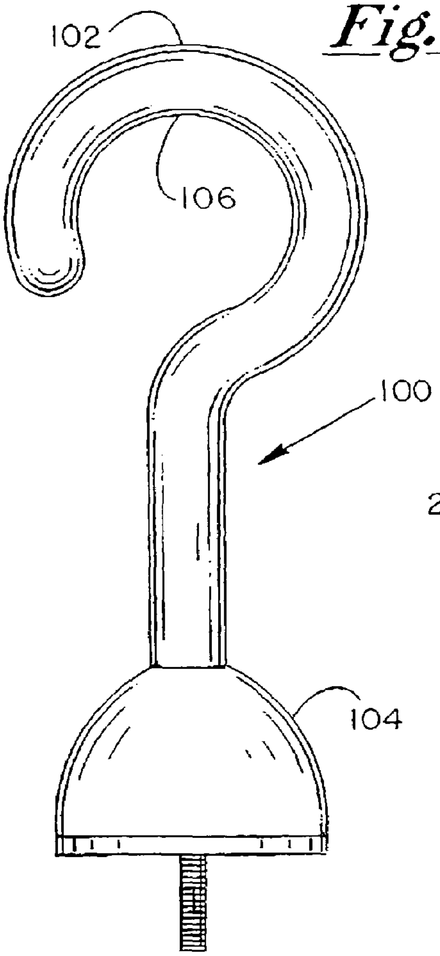
FIG. 6 is an alternative embodiment of the apparatus in accordance with the present invention.
Figure 7:
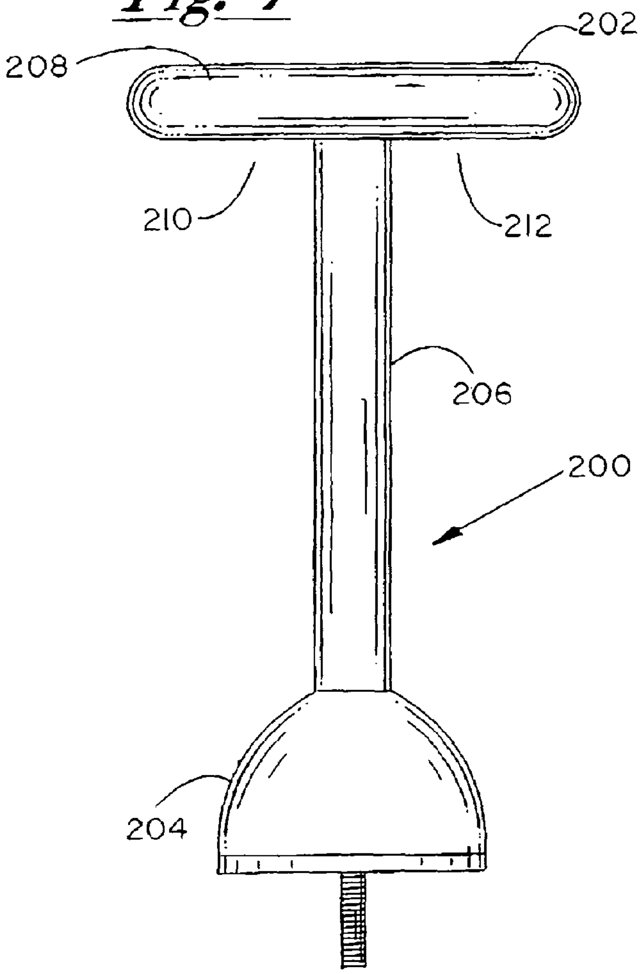
FIG. 7 is another alternative embodiment of an apparatus in accordance with the present invention.
Figure 8:
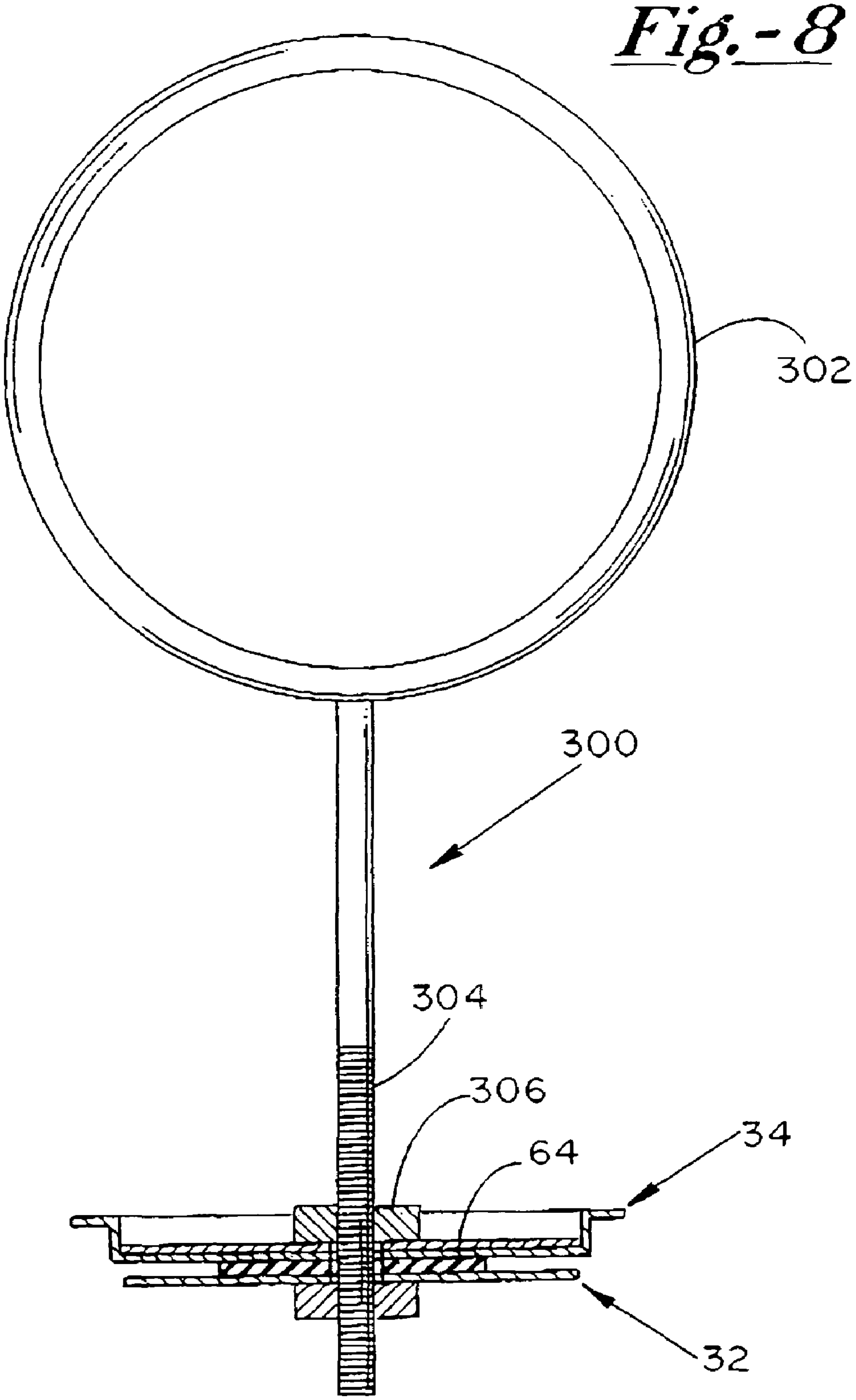
FIG. 8 is yet another alternative embodiment of an apparatus in accordance with the present invention.

FIGS. 6-8 show various alternative embodiments of a cover in accordance with the present invention.

FIG. 6 provides a cover 100 having a generally hook shaped handle 102 connected to the base 104. The handle 102 defines an open boundary of the receiving section 106 for allowing the retrieval device 36 access thereto.

FIG. 7 provides a cover 200 having a generally T-shaped handle 202 connected to the base 204. The upright section 206 and horizontal section 208 define a pair of opposing receiving sections 210, 212 for facilitating retrieval of the apparatus.

FIG. 8 provides a cover 300 having a ring shaped handle 302 formed as a unitary structure with the connecting sleeve 304. The base 306 comprises a nut and a washer configured to engage the test plug 34 either with or without a pressure seal 64 positioned between the base 306 and test plug 34.

FIGS. 9-12 provide various embodiments of the retrieval ends of the retrieval device. Any of the various embodiments of the retrieval ends may be incorporated with the elongate body 38 of the retrieval device 36. It is understood that the elongate body 38 may incorporate any number and variety of extension attachments as are commonly known, to allow the retrieval device 36 to extend from a first end 40 at a remote position P to a second end 42 capable of engaging the apparatus 22 positioned over a vent 10.

Figure 9:
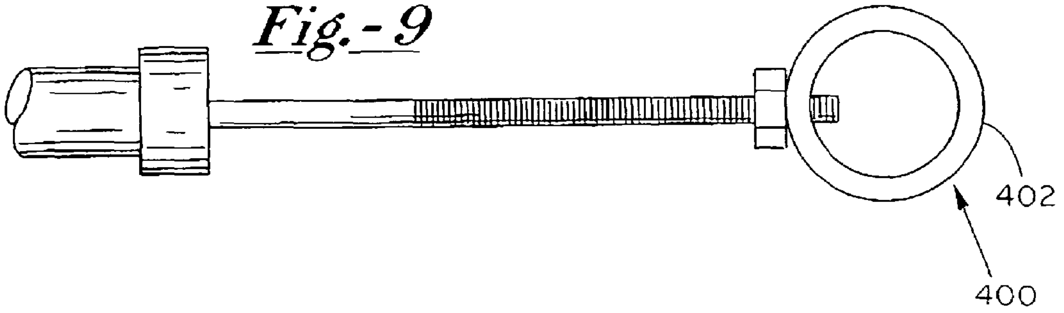
FIG. 9 is a first embodiment of a retrieval device in accordance with the present invention.

As shown in FIG. 9, a retrieval section 400 is defined by a closed loop structure 402. The closed loop structure 402 extends rigidly from the end 42 of the elongate body 38 of the retrieval device 36 such that it may be looped around a handle in accordance with one or more of the various embodiments of the present invention.

Figure 10:
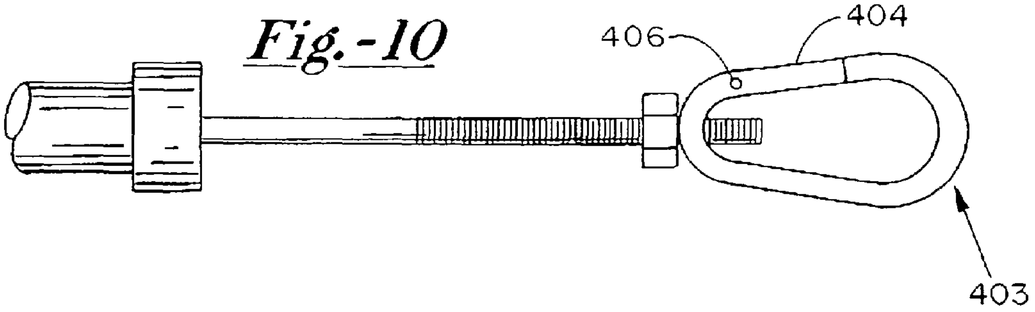
FIG. 10 is a second embodiment of a retrieval device in accordance with the present invention.

FIG. 10 provides a retrieval device 36 having a receiving link as a retrieval section 403. The receiving link 403 defines a close loop structure having a selectively openable link section 404. The link section 404 has a hinge 406 that opens inwardly and is biased in a closed configuration. When the link section 404 is contacted by the handle, the hinge 406 will open to allow the handle to be received within the receiving link 403 and the link section 404 will close such that the handle is encircled by the receiving link 403 for removal of the apparatus 22 from the vent 10.

Figure 11:
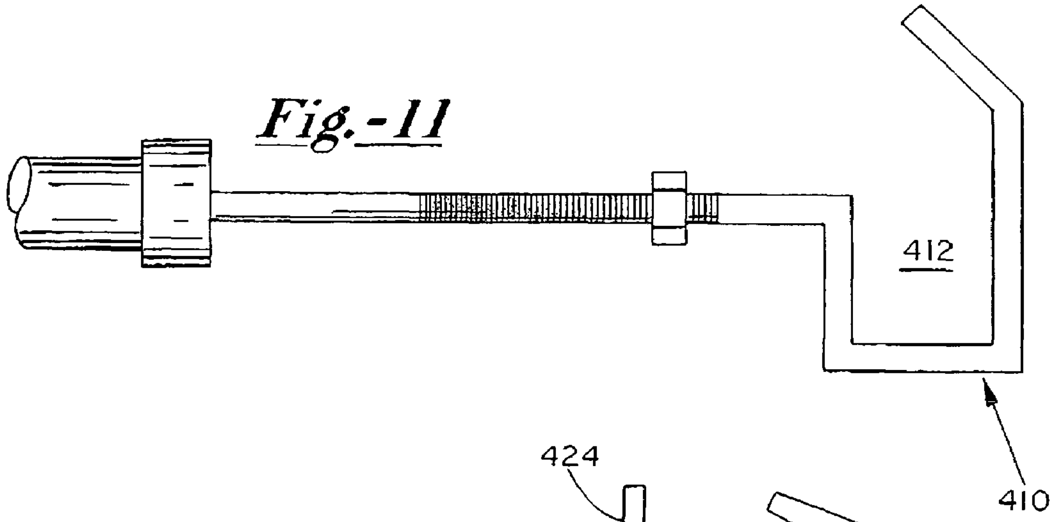
FIG. 11 is a third embodiment of a retrieval device in accordance with the present invention.

FIG. 11 provides a retrieval device 36 having a generally hook shaped retrieval section 410. The retrieval section 410 is configured to define a partial boundary of a receiving area whereas one section of the receiving area 412 is open to receive the handle of the apparatus 22 therein.

Figure 12:
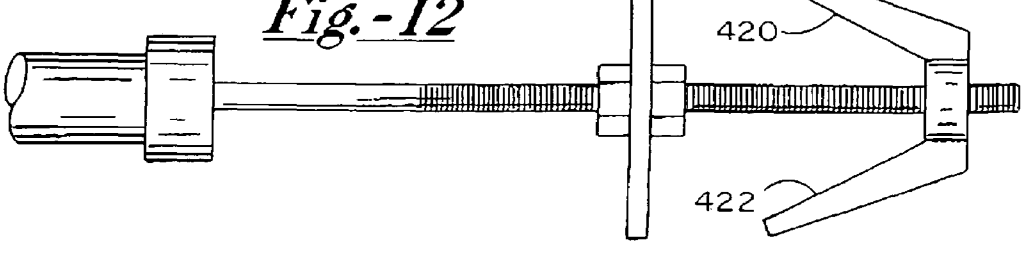
FIG. 12 is yet another alternative embodiment of a retrieval device in accordance with the present invention.

FIG. 12 provides a retrieval device 36 having a biased set of retaining arms 420, 422. The retaining arms 420, 422 are pivotable and biased in an outwardly extended configuration. The retaining arms 420, 422 are configured to pivot inwardly towards the elongate body 38 of the retrieval device 36 when contacting the handle of the apparatus 22 as the retaining arms 420, 422 are extended through the receiving section of the apparatus 22. Once through, the retaining arms 420, 422 extend outwardly to engage the handle and remove the apparatus 22 from the vent 10.

The retrieval device 36 may further include a washer 424 fixedly extending outwardly from the body 38 of the retrieval device 36.

Once the retrieval section of the retrieval device 36 receives the handle of the apparatus 22, the apparatus 22 is removed from the vent 10 by forcibly engaging the apparatus 22 with the retrieval device 36, causing the test plug 34 to fracture and allowing the apparatus 22 to be retrieved from the vent 10.

The various embodiments of the present invention are illustrative of the scope and spirit of the present invention and are in no way intended to be limiting as to the various structures and functions that may be employed in accordance with the present invention.

What is claimed is:

1. Apparatus for removing a test plug from a vent, said apparatus comprising:

a) a cover configured to visibly extend from an upper edge of the vent;

b) a retainer positionable within the vent;

c) a connecting sleeve configured to selectively couple said retainer to said cover and to maintain the test plug between said retainer and said cover;

wherein said cover is constructed and arranged to be forcibly engagable by a retrieval device extending from a remote position with respect to the vent to allow removal of at least a portion of the test plug from the vent.

2. The apparatus according to claim 1 further comprising at least a single pressure seal positioned about said connecting sleeve, said pressure seal configured to sealingly engage the test plug when the vent is pressurized.

3. The apparatus according to claim 1 further comprising a pair of pressure seals positionable on opposing sides of the test plug.

4. The apparatus according to claim 1 wherein said cover comprises a handle defining an eyelet.

5. The apparatus according to claim 4 further comprising said retrieval device.

6. The apparatus according to claim 5 wherein said retrieval device comprises a toggle arm for engaging said handle of said cover when said retrieval device extends through said eyelet.

7. The apparatus according to claim 6 further comprising said test plug.

8. The apparatus according to claim 7 wherein said test plug comprises a frangible disc shaped body having a central aperture therethrough.

9. The apparatus according to claim 8 wherein said test plug further comprises a cylindrical sidewall extending about a periphery of said disc shaped body.

10. Apparatus for facilitating removal of a temporary test plug from a vent using an elongate retrieval device extending from a remote position with respect to the vent, said apparatus comprising:

a) a handle visibly extending outwardly from the vent, said handle having a retrieval section engagable by the elongate retrieval device, said handle having a base for engaging a first side of the test plug;

b) a retainer having a retaining surface for engaging a second side of the test plug;

c) a connecting sleeve selectively extending from said base to said retainer and configured to extend through an aperture in the test plug to operably maintain the test plug between said base and said retainer.

11. The apparatus in accordance with claim 10 wherein said handle and said base are a unitary structure.

12. The apparatus in accordance with claim 11 wherein said handle comprises a generally ring shaped structure.

13. The apparatus in accordance with claim 11 wherein said handle comprises a generally hook shaped structure.

14. The apparatus in accordance with claim 11 wherein said handle comprises a generally T-shaped structure.

15. The apparatus in accordance with claim 10 further comprising said test plug.

16. The apparatus in accordance with claim 10 wherein said test plug is a frangible disc shaped body having an aperture for receiving said connecting sleeve therethrough.

17. The apparatus in accordance with claim 16 wherein said test plug further comprises a cylindrical side wall for sealingly engaging an inner wall of the vent.

18. The apparatus in accordance with claim 17 further comprising said retrieval device.

19. A method for removing a vent cover assembly from a vent when at a remote position with respect to the vent, said method comprising the steps of:

a) engaging the vent cover assembly with an elongate retrieval device extending from the remote position to the vent, wherein the vent cover assembly comprises:

i) a handle visibly extending from the vent and engagable by a retrieval section of the elongate retrieval device;

ii) a retainer positioned within the vent and coupled to the handle by a connecting sleeve; and iii) a test plug selectively maintained about the connecting sleeve between the handle and the retainer;

b) removing the vent cover assembly from the vent by forcibly engaging the handle of the vent cover assembly with the retrieval section of the elongate retrieval device to fracture the test plug and remove the vent cover assembly from the vent.

* * * * *